(12) United States Patent
Rosenthal et al.

(10) Patent No.: US 9,570,046 B2
(45) Date of Patent: Feb. 14, 2017

(54) METHOD AND APPARATUS FOR RENDERING CONTENT

(75) Inventors: Noam Rosenthal, San Francisco, CA (US); Timo Tapani Vitikainen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1746 days.

(21) Appl. No.: 12/880,480

(22) Filed: Sep. 13, 2010

(65) Prior Publication Data
US 2012/0062576 A1    Mar. 15, 2012

(51) Int. Cl.
G09G 5/00    (2006.01)
G09G 5/14    (2006.01)
G09G 5/34    (2006.01)
G06T 15/00   (2011.01)

(52) U.S. Cl.
CPC .............. *G09G 5/14* (2013.01); *G06T 15/00* (2013.01); *G09G 5/34* (2013.01); *G09G 2350/00* (2013.01); *G09G 2370/027* (2013.01)

(58) Field of Classification Search
None
See application file for complete search history.

(56) References Cited

U.S. PATENT DOCUMENTS

| | | | |
|---|---|---|---|
| 5,821,950 A | 10/1998 | Rentschler et al. | |
| 6,335,765 B1* | 1/2002 | Daly et al. | 348/586 |
| 6,822,655 B1* | 11/2004 | Marion et al. | 345/544 |
| 6,856,323 B2* | 2/2005 | Moore | 345/629 |
| 2003/0084298 A1 | 5/2003 | Messerges et al. | |
| 2006/0233242 A1* | 10/2006 | Wang et al. | 375/240.08 |
| 2008/0240389 A1* | 10/2008 | Gaume et al. | 379/142.04 |

FOREIGN PATENT DOCUMENTS

WO    WO 2007/099706 A1    9/2007

* cited by examiner

*Primary Examiner* — David H Chu
(74) *Attorney, Agent, or Firm* — Ditthavong & Steiner, P.C.

(57) ABSTRACT

An approach is provided for rendering content based on chunks and layers. A request is received to render content at a device. One or more layers of the content are determined. One or more patterns are determined corresponding to one or more of the layers. One or more chunks are determined based, at least in part, on the one or more patterns. At least one of the layers and corresponding one or more chunks are determined to be rendered separately from the other layers.

20 Claims, 11 Drawing Sheets

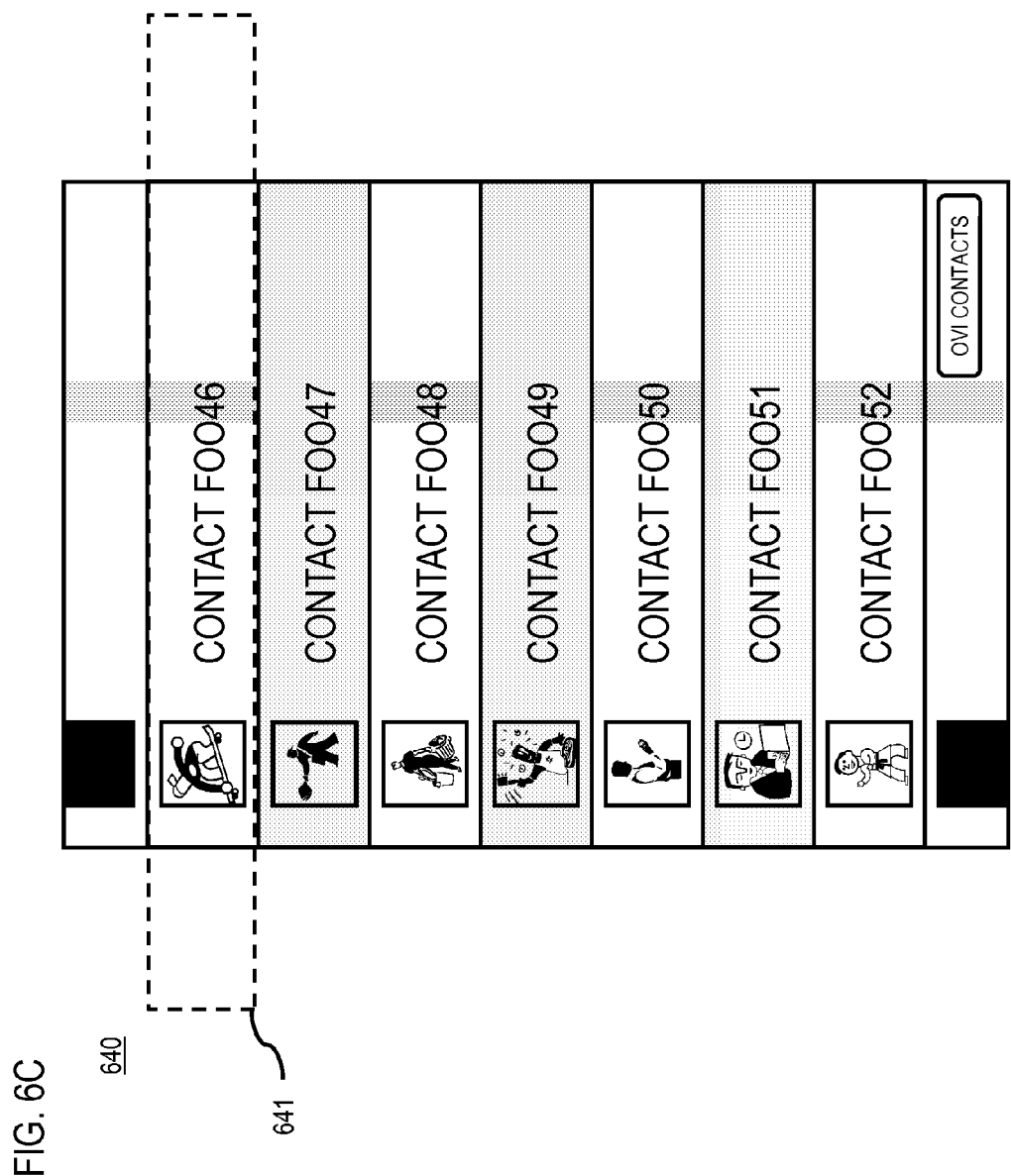

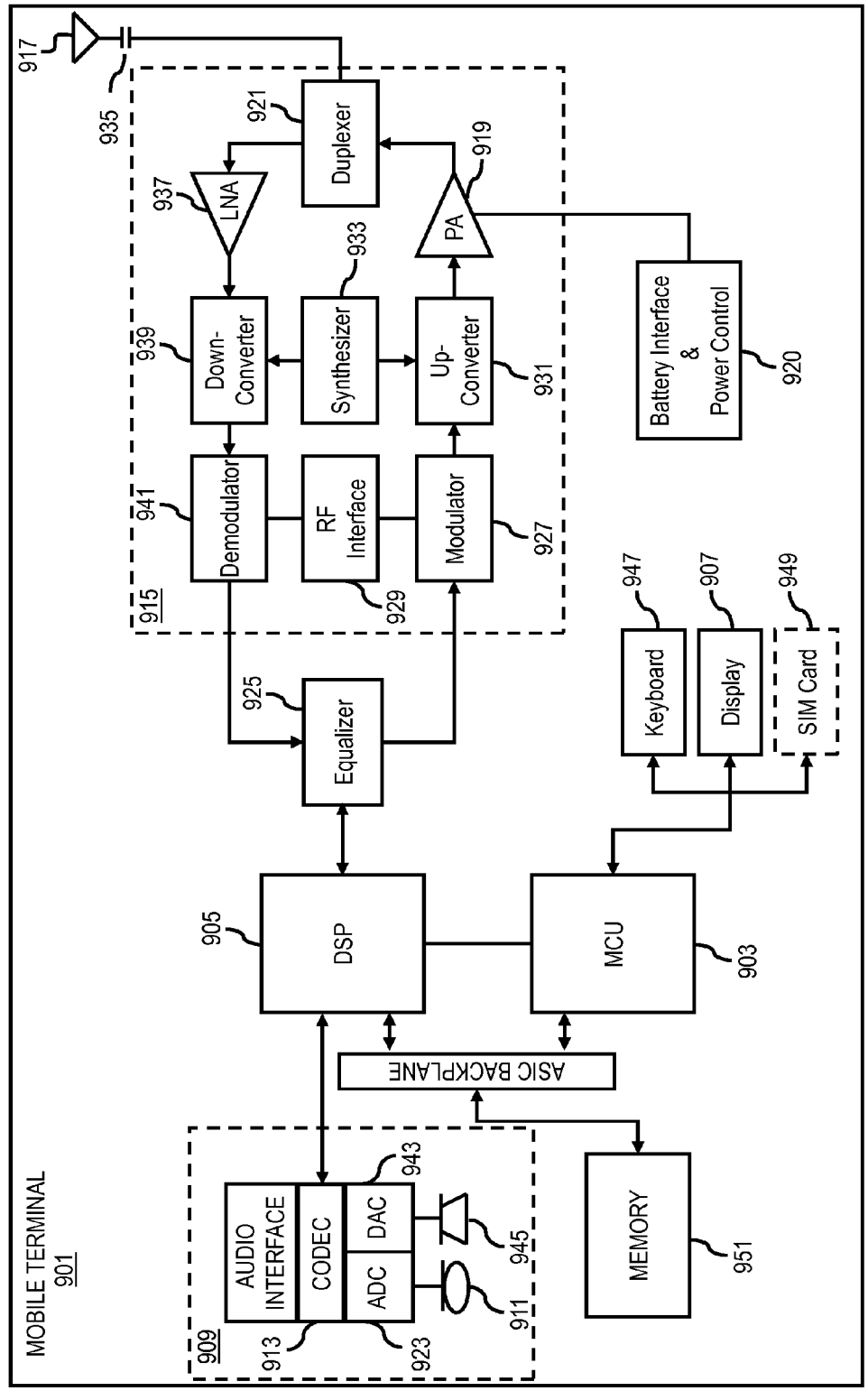

METHOD AND APPARATUS FOR RENDERING CONTENT

BACKGROUND

Service providers and device manufacturers (e.g., wireless, cellular, etc.) are continually challenged to deliver value and convenience to consumers by, for example, providing compelling network services. One area of interest has been the development of services and technologies using web-based applications. In particular, service providers are developing content that can be displayed on devices (e.g., via the web). However, service providers and device manufacturers face significant challenges to providing content to users efficiently. For example, some devices may have limited processing power and/or bandwidth capabilities. As such, these devices may be slow to retrieve and render content to present to a user. Such latency can lead to a negative user experience for users of a service and/or device, which may cost a service and/or device manufacturer a customer.

SOME EXAMPLE EMBODIMENTS

Therefore, there is a need for an approach for more efficiently render content.

According to one embodiment, a method comprises receiving a request to render content at a device. The method also comprises determining one or more layers of the content. The method further comprises determining one or more patterns of the content corresponding to one or more of the layers. The method also comprises determining one or more chunks based, at least in part, on the one or more patterns. The method further comprises determining to render at least one of the layers and the corresponding one or more chunks separately from the other layers.

According to another embodiment, an apparatus comprises at least one processor, and at least one memory including computer program code, the at least one memory and the computer program code configured to, with the at least one processor, cause, at least in part, the apparatus to receive a request to render content at a device. The apparatus is also caused to determine one or more layers of the content. The apparatus is further caused to determine one or more patterns of the content corresponding to one or more of the layers. The apparatus is also caused to determine one or more chunks based, at least in part, on the one or more patterns. The apparatus is further caused to determine to render at least one of the layers and the corresponding one or more chunks separately from the other layers.

According to another embodiment, a computer-readable storage medium carries one or more sequences of one or more instructions which, when executed by one or more processors, cause, at least in part, an apparatus to receive a request to render content at a device. The apparatus is also caused to determine one or more layers of the content. The apparatus is further caused to determine one or more patterns of the content corresponding to one or more of the layers. The apparatus is also caused to determine one or more chunks based, at least in part, on the one or more patterns. The apparatus is further caused to determine to render at least one of the layers and the corresponding one or more chunks separately from the other layers.

According to another embodiment, an apparatus comprises means for receiving a request to render content at a device. The apparatus also comprises means for determining one or more layers of the content. The apparatus further comprises means for determining one or more patterns of the content corresponding to one or more of the layers. The apparatus also comprises means for determining one or more chunks based, at least in part, on the one or more patterns. The apparatus further comprises means for determining to render at least one of the layers and the corresponding one or more chunks separately from the other layers.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6C are diagrams of user interfaces utilized in the processes of FIGS. 3 and 4, according to various embodiments;

FIG. 9 is a diagram of a mobile terminal (e.g., handset) that can be used to implement an embodiment of the invention.

DESCRIPTION OF SOME EMBODIMENTS

Examples of a method, apparatus, and computer program for rendering content based on layers and chunks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
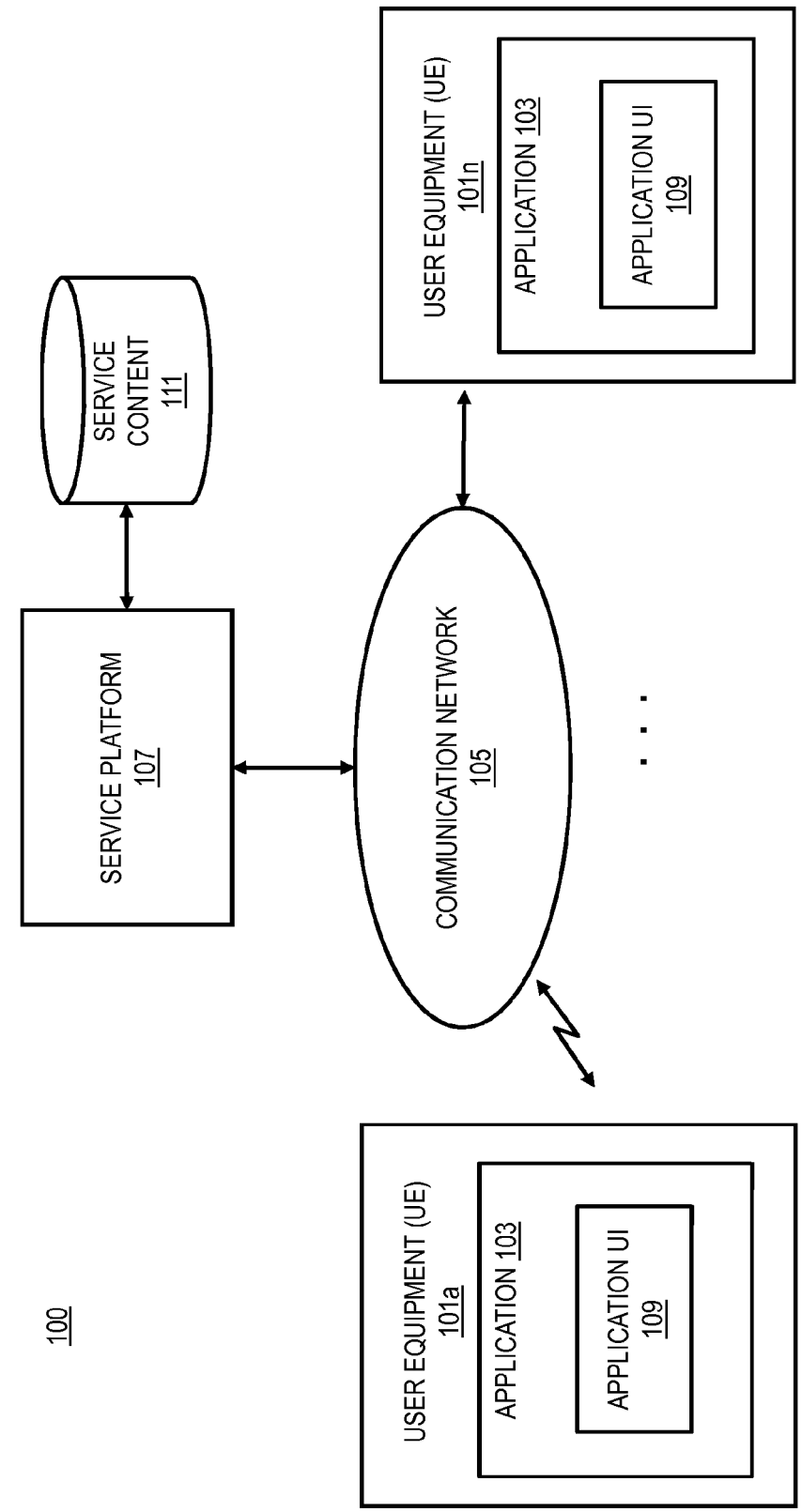
FIG. 1 is a diagram of a system capable of rendering content based on layers and chunks, according to one embodiment.

FIG. 1 is a diagram of a system capable of rendering content based on layers and chunks, according to one embodiment. Content is generated by service providers to present to users of devices. In certain embodiments, content is information that can be displayed to a user. Such content can include Internet oriented information such as one or more web pages. Further, the content can include one or more images, text, icons, videos, media objects, texture, or the like. Moreover, the content can be presented in a list format (e.g., a scrollable list). Additionally or alternatively, the content may be interactive.

Content to be presented via scrolling on a user interface can utilize engines such as WebKit to render web pages. Default scrolling in WebKit copies pixels. This operation does not allow for fixed positioned elements. Thus WebKit is optimized for scrolling actions such as reading documents. Here, WebKit is used to render each item to be presented separately. This may create a bottleneck. That is, at some point during kinetic scrolling, the scrolling would be faster than the amount of time it takes to render a single item. Further, compositing each item (e.g., image, text, icon, etc.) in a texture can have the same issue. A render and texture upload per item can create overhead that limits scrolling speed. As such, the capability to provide information to a user can be hindered due to processing capabilities of a device used by the user.

To address this problem, a system 100 of FIG. 1 introduces the capability to render content based on layers and chunks, according to one embodiment. User equipment (UEs) 101a-101n can execute applications 103 (e.g., web browsers) to present content. The content can be received via a communication network 105 from a service platform 107. An application user interface (UI) 109 can be utilized to present the content to a user of the UE 101. In certain scenarios, the content is stored as service content 111 in a database associated with the service platform 107.

A user can activate the application 103 on the UE 101 to browse content. As such, the application 103 can enter a state to render content associated with the application 103. The content can be split into layers (e.g., a background layer, a transformation layer, a shading layer, a list element clipping layer, etc.). Further, the content can be rendered based on chunks of content items. A chunk, according to certain embodiments, is a fragment of information. A chunk can include a set of data that can be processed (e.g., by a processor, a graphics processor, etc.).

Moreover, the content can be displayed via the application UI 109 on the UE 101. The application UI 109 can present the content via a viewport. In certain embodiments, a viewport is a region (e.g., a rectangular region) in computer graphics. The viewport can be the visible portion of a graphical area that is larger than a display of the UE 101 and is further detailed in FIG. 3.

When the UE 101 determines to render the content to present to a user, a processor or graphics processor can receive a request to render content. The one or more layers of the content can also be determined. For example, the content can include a scrollable list with one or more background images associated with a first layer, one or more images in a second layer, scrolling list objects in a third layer, and one or more foreground images in a fourth layer. Each layer can include chunks that can be utilized to render content as further shown in FIG. 3. One or more of the layers may include chunks that are associated with a pattern. This pattern can be determined and utilized in rendering that layer. Each of the layers can additionally be rendered separately and then combined to present the content via a viewport of the application UI 109.

When the chunks of the layers are rendered, the chunks can be cached in a memory. Thus, when a chunk is repeated according to a pattern, the chunk can quickly be utilized. Further, with the layer approach, a background image need not be re-rendered each time a new scrolling list item is presented.

The service platform 107 can host the service content 111 for the UEs 101. The content can be in the form of applications and/or services implemented using web technologies. The service platform 107 can provide an application programming interface to allow applications 103 on the UEs 101 to access the service content. In certain examples, the service content includes one or more list objects. List objects can include one or more image items, one or more text items, one or more icons, etc. For example, the list objects can be associated with a contact list of the user. The contact list may include one or more images (e.g., icons or photographs) associated with each contact entry as well as textual information. The application programming interface can thus send content as information to the UE 101.

The UE 101 can receive the content via the communication network 105 and may store the content on the UE 101. At least a portion of the content is presented via the application UI 109. If there is more information associated with the content, but not needed for immediate presentation in the application UI 109, the UE 101 can determine to retrieve the associated content, retrieve the associated content when needed, pre-cache a portion of the associated content, or a combination thereof.

The application 103 can be a web application and/or run via a web browser. As such, a web application may include components (e.g., objects, functions, data structures, elements, etc.) written in one or more software languages such as JavaScript, Java, Hyper Text Markup Language (HTML), Extensible Markup Language (XML), a combination thereof, etc. Moreover, the web application may or may not utilize the Internet or web while executing. Further, the web application can include software objects that are self-contained collections of data. By way of example, web applications may be based on standard web technologies (e.g., web runtime (WRT)—a web application runtime environment included in many browsers), that serve as frontends or clients to web-based content or other content.

The application 103 may additionally utilize one or more software libraries to utilize hardware components of the UE 101. For example, WebKit, a layout engine to enable web browsers to render web pages, can be utilized. WebKit provides a set of classes to display web content in windows. Hardware acceleration can be utilized via the accelerated compositing code path of WebKit. Accelerated compositing enables mapping certain elements on a web page into bitmaps. This can be enabled while maintaining painting order. Further, the bitmaps can be moved and/or transformed via the accelerated compositing. Additionally, the accelerated compositing code can be utilized for mapping the bitmaps to hardware. Then, the hardware (e.g., graphics logic) can render the bitmaps.

As previously noted, one or more types of layers can be utilized in preparing the renderings. One such layer can include a list of scrollable items. This layer can act as a clipping layer that can be used to determine what information gets presented. Another layer can include one or more fixed images or easily used images. For example, a small number or a fixed position background element and/or foreground element can be utilized to provide customizations without need for re-rendering for changes to other layers. Further, a transformation layer can be utilized. In one example, the content layer may include a HTML content div to transform content presentation. Further, another layer can include chunks of items associated with the list. Other layers can include single items such as thumbnails that can be composited separately to their own texture.

Textures can be created by rendering the chunks. These chunks are then uploaded to graphics logic for presentation. A graphics memory can be utilized to buffer or cache the chunks. As such, control logic (e.g., a processor) of a UE 101 need not be involved with rendering content from which chunks are already stored in graphics memory. Further, rendering chunks and then uploading the chunks as textures to the graphics memory can improve overhead costs of rendering and uploading multiple items.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and service platform 107, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, one or more UEs 101 may interact according to a client-server model with one or more service platforms 107. According to the client-server model, a client process sends a message including a request to a server process, and the server process responds by providing a service (e.g., access to content). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
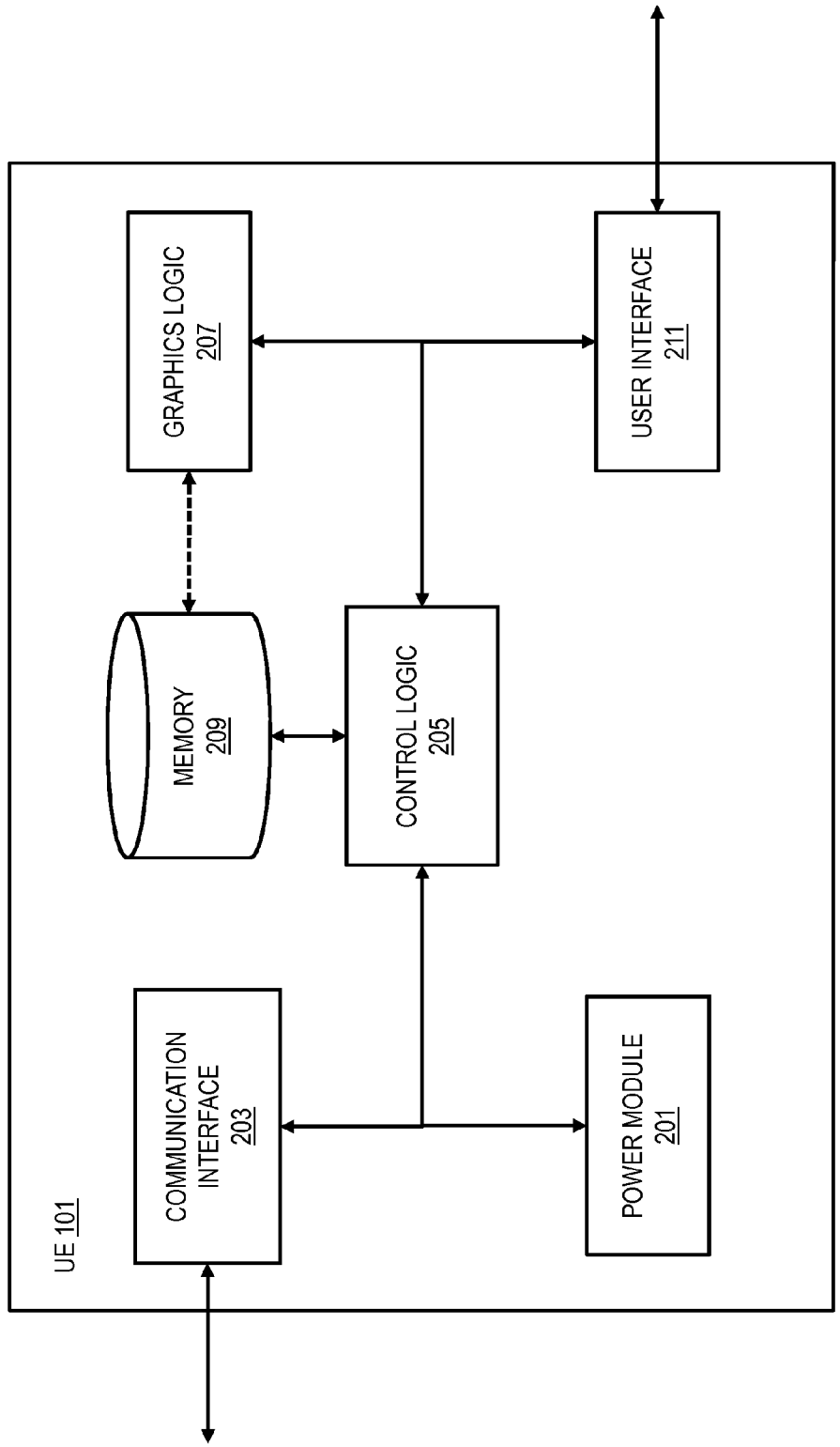
FIG. 2 is a diagram of the components of user equipment, according to one embodiment.

FIG. 2 is a diagram of the components of user equipment, according to one embodiment. By way of example, the UE 101 includes one or more components for rendering content based on layers and chunks. It is contemplated that the functions of these components may be combined in one or more components or performed by other components of equivalent functionality. In this embodiment, the UE 101 includes a power module 201, one or more communication interfaces 203, control logic 205, graphics logic 207, memory 209, and a user interface 211.

The power module 201 provides power to the UE 101. The power module 201 can include any type of power source (e.g., battery, plug-in, etc.). Additionally, the power module 201 can provide power to the components of the UE 101 including processors, memory, and transmitters. Further, the power module 201 can be utilized to determine processing power of the UE 101 (e.g., when the UE 101 operates utilizing a battery). As such, the power module 201 can monitor the consumption of power.

The communication interface 203 can be used to communicate with the service platform 107 as well as other UEs 101 and devices connected to the communication network 105. Certain communications can be via methods such as an internet protocol, messaging (e.g., Short Message Service (SMS), Multimedia Messaging Service (MMS), etc.), or any other communication method (e.g., via the communication network 105). Further, the communications between the UE 101 and the communication network 105 may be via a wireless means (e.g., UE 101a) or a wired means (e.g., UE 101n).

The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc. In certain embodiments, the user interface 211, control logic 205, and/or graphics logic 207 can be means for presenting information to the user of the UE 101.

The control logic 205 and memory 209 can be utilized to execute an application 103. The application 103 can utilize an application UI 109 that can be presented via the user interface 211. As previously noted, a viewport of the user interface 211 can be associated with the presentation. The viewport can thus be utilized to present layers of content. Each of these layers can be associated with one or more chunks that can be separately rendered by the graphics logic 207 and/or control logic 205. The chunks can be stored in memory 209 and can be cached to enable a more responsive presentation. Further, the chunks can be pre-cached based on one or more associations of a region of chunks and the viewport as further detailed in FIG. 3. By utilizing chunks for rendering, in certain embodiments, the graphics logic 207 can be utilized for more of the processing and rendering of content items allowing for control logic 205 to perform other processes.

In certain embodiments, more than one type of memory 209 can be used. For example, a main memory can be associated with the control logic 205 while another specialized memory can be associated with the graphics logic 207. This specialized memory can be used as a cache for rendered content to be presented via the user interface 211.

Figure 3:
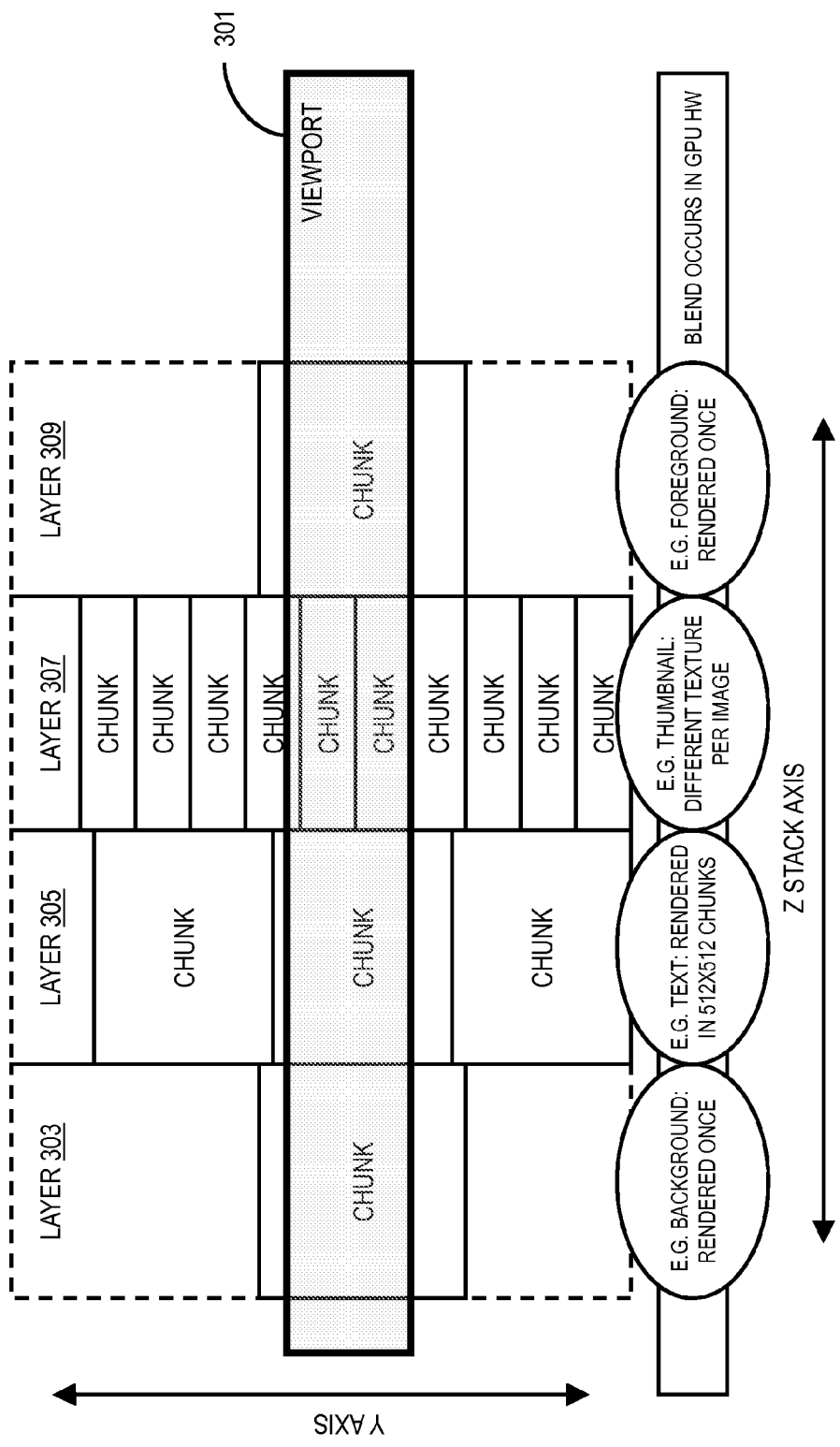
FIG. 3 is a diagram of an example structure of layers and chunks utilized for rendering content, according to one embodiment.

FIG. 3 is a diagram of an example structure of layers and chunks utilized for rendering content, according to one embodiment. A viewport 301 can be utilized to present content portioned into multiple layers, e.g., layers 303, 305, 307, and 309. In this example, layer 303 is associated with a single background chunk that is rendered once and then utilized in the presentation via the viewport 301.

Layer 305 can represent other content, such as text associated with the content. The text associated with one or more items can be rendered as a single chunk. For example, chunks in layer 305 can be rendered according to a particular size range (e.g., a number of pixels). By rendering chunks instead of separate items (e.g., each line of text), less overhead processing (e.g., headers, footers, error checks, etc.) is needed because multiple items are combined. Thus, one chunk of ten items can require less processing than ten separate items.

Other layers, such as layer 307 can include chunks of a different size. Layer 307 shows multiple chunks available on the viewport 301. Chunk size can depend on one or more criteria. For example, the chunk size can be predetermined, based on a content type (e.g., graphics, text, etc.), based on processing required per chunk, or the like.

Further, layer 309 shows a foreground layer. Layer 309, in certain scenarios, need only be rendered once and then combined with the other layers 303, 305, 307. The foreground layer, as with any layer, can include one or more user interface elements that can be interactive. For example, the layer 309 may include a button that can be selected to perform an interaction. Under certain scenarios, the layers 303, 305, 307, 309 can be blended together for presentation via the viewport 301 utilizing the graphics logic 207 and/or control logic 205. The layering and chunking architecture can be utilized to offload processes from the control logic 205 to the graphics logic 207 by generating the chunks and having the chunks rendered using the graphics logic 207. Further examples of the layers 303, 305, 307, 309 are detailed in FIGS. 6A-6C. Moreover, chunks in layer 307 can be smaller in size because of more complex content.

A user can scroll through the content by entering input (e.g., via a touch screen associated with the user interface 211 of the UE 101). When scrolling occurs, the background layer 303 and foreground layer 309 can be rendered once and presented while other layers 305, 307 change in accordance to content scrolling. Thus, different chunks can be presented via the viewport 301 based on the scrolling.

This example shows content from the view of a Y axis and a Z axis. However, it is contemplated that the content can be viewed in multiple dimensions. Further, the chunks can be structured in multiple directions. As such, a user of the UE 101 viewing via a viewport 301 can scroll through the content in multiple directions.

When the content is rendered for presentation, the items associated with each layer are formed into chunks. These chunks can be cached for each layer. As such, while scrolling, chunks can be reused when repeated (e.g., in the case of a pattern in the layer) and/or when reused (e.g., when the user scrolls back).

In certain embodiments, chunks can be associated with one or more scroll ranges. For example, each chunk can be responsible for a particular scroll range associated with a layer of content. In certain scenarios, background and foreground layers may not require a scroll range because the layer has a fixed image. Further, in certain scenarios, the chunks can be associated with a pattern according to the scroll range. For example, every other chunk may be the same. A scroll range can be determined based on the content. For example, an HTML page can include scrolling parameters. Further, content available on the viewport 301 can be based on a particular scroll range and the content available through that viewport.

Figure 4:
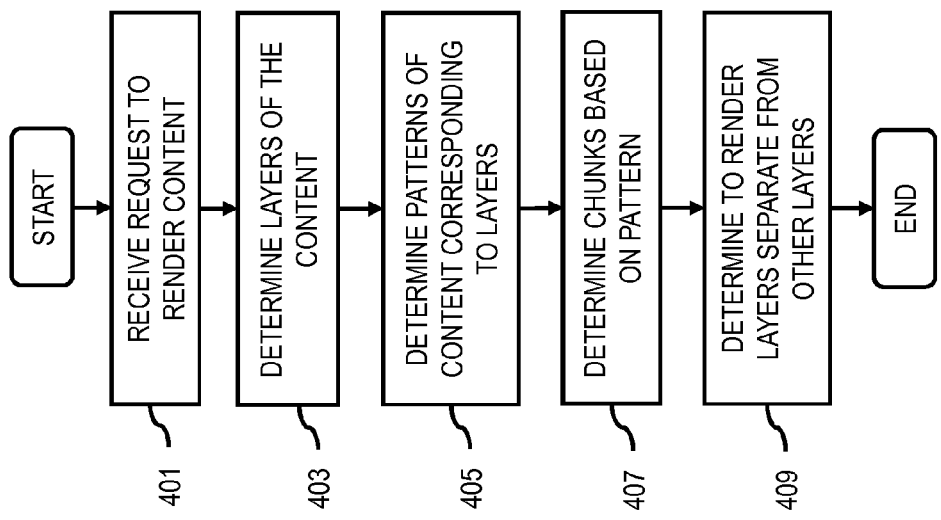
FIGS. 4 and 5 are flowcharts of processes for rendering content based on layers and chunks, according to various embodiments.
Figure 8:
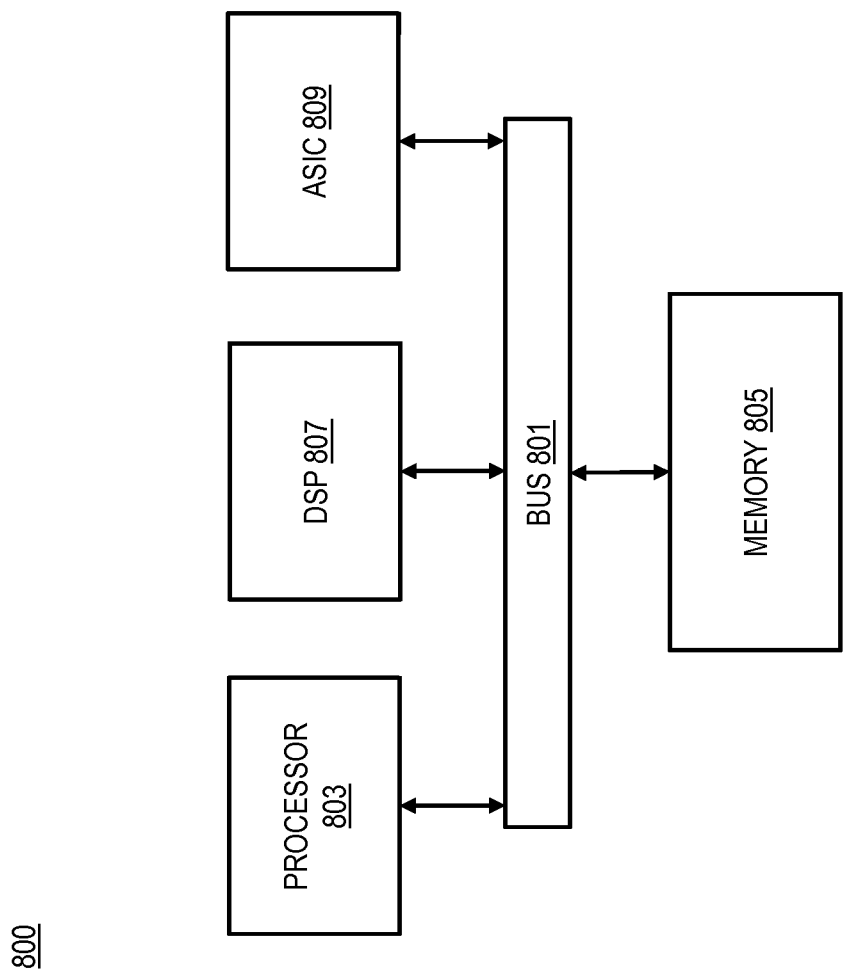
FIG. 8 is a diagram of a chip set that can be used to implement an embodiment of the invention.

FIG. 4 is a flowchart of a process for rendering content based on layers and chunks, according to one embodiment. In one embodiment, the control logic 205 and/or graphics logic 207 performs the process 400 and is implemented in, for instance, a chip set including a processor and a memory as shown in FIG. 8. Thus, the control logic 205 and/or graphics logic 207 can be a means for implementing the process 400 as well as other steps.

At step 401, the control logic 205 receives a request to render content at the UE 101. The render request can be based on an application 103 executing on the control logic 205 and/or other remote and domestic applications and/or services. Further, the request can be based on a received input (e.g., from a user) specifying a portion of the content for display. In certain scenarios, this input can occur from user browsing. When the user to content larger than a screen associated with the UE 101, the user can scroll or pan the screen to view additional portions of the content. Thus, the user can specify the portion of the content for presentation via the screen. In certain scenarios, the user can utilize a touch enabled interface to scroll through the content. Additionally, in some embodiments, the content can represent a scrollable list of a plurality of items (e.g., contact list names, contact list images, grocery list text, grocery list images, backgrounds, foregrounds, selectable icons, etc.).

Then, at step 403, the control logic 205 determines one or more layers of the content. This determination can be based on a predefined structure from which the content is stored. One or more cues (e.g., flags, pointers, identifiers, scroll location, etc.) can be used to determine which layer a particular content item is associated with. Further, the cues may be utilized to notify the application 103 of one or more chunks associated with content. These cues can also be used to determine one or more patterns of the content corresponding to one or more of the layers (step 405). The patterns can be determined based on whether or not a particular chunk is associated with a particular portion of the content.

Thus, one or more chunks can be determined based, at least in part, on the one or more patterns (step 407). Each chunk can correspond to a particular area on a bitmap associated with the content. When the chunks are duplicated according to the pattern or other criteria (e.g., based on an identifier), the chunks can be presented with less processing. This can occur if, for example, the chunk is reused according to the pattern. In this scenario, the pattern can be repeatable according to a geometry-based pattern. For example, a rule for the pattern may state that every other chunk in a particular layer is shaded the color blue and the other chunks are shaded green. As such, chunks for these locations need only be rendered based on items one time and stored in a cache. Then, the chunks can be utilized for display instead of re-rendering the items from scratch. In other scenarios, the chunks can be determined based on criteria and/or identifiers instead of a pattern. For example, the reuse of the chunks can be based on an algorithm.

At step 409, the control logic 205 determines to render at least one of the layers and the corresponding one or more chunks separately from the other layers. The rendering can occur at the control logic 205, the graphics logic 207, or a combination thereof. Each layer can be rendered according to its corresponding chunks. Then, the control logic 205 and/or graphics logic 207 can be utilized to combine and cause presentation of the portion of the content associated with the chunks (e.g., a portion associated with a viewport) via a display. One or more of the chunks are cached at a rendering engine (e.g., via a cache memory 209).

Another input can be received specifying a scrolling of the viewport to display another portion of the content. The scrolling can be associated with a scroll range. The scroll range can be utilized as a cue in determining repeating chunks and are further detailed in FIG. 5. The control logic 205 and/or graphics logic 207 can determine a set of items within the scroll range and determine one or more chunks based on the set of items. Thus, one or more chunks can be based, at least in part, on the input. Chunks need not be re-rendered from the items if the chunks within the scroll range are stored in the cache. As such, the control logic 205 and/or graphics logic 207 can determine to recycle the chunks for the rendering of the portion of the content and/or subsequent renderings of the content.

Figure 5:
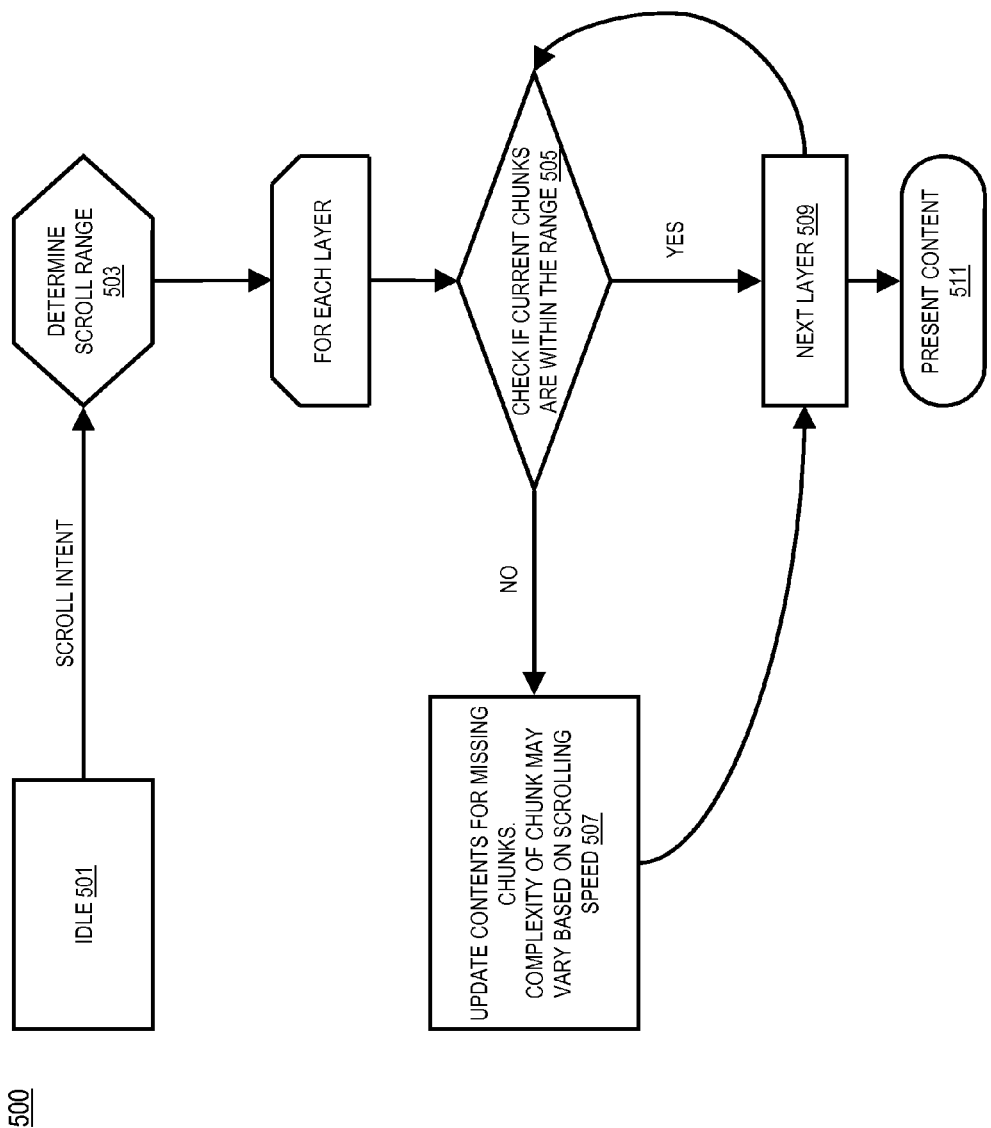

FIG. 5 is a flowchart of a process for rendering content based on layers and chunks, according to one embodiment. In one embodiment, the control logic 205 and/or graphics logic 207 performs the process 500 and is implemented in, for instance, a chip set including a processor and a memory as shown in FIG. 8. Thus, the control logic 205 and/or graphics logic 207 can be a means for implementing the process 500 as well as other steps.

The user can start an application 103 on the user's UE 101 and navigate to scrollable content. The content can be presented via a viewport that can scroll through the content. As such, the content can be presented in an idle state in which no input is being received by the user (step 501).

Then, the control logic 205 receives scroll intent. The scroll intent can be received as part of an input from the user. The scroll intent can be represented by a request to scroll or pan the viewport to view another portion of content. Input can be received in the form of a touch screen gesture, a click on an associated scroll bar or scroll arrow, a scroll wheel input, etc.

Then, at step 503, the control logic 205 determines a scroll range associated with the new scroll intent. The content can be mapped to areas using one or more identifiers (e.g., a grid). The scroll range can be a portion of the content that is viewable in the viewport. Further, the scroll range can be multidimensional. For example, the user may be able to scroll in the X direction and the Y direction in a display.

For each layer, the control logic 205 determines whether the current chunks that have been rendered are within the scroll range (step 505). This may occur if, for example, a rendered chunk is partially presented and another portion of the chunk is presented due to the scroll intent. In this scenario, the same chunk can be reused with a different portion displayed on the viewport. Further, in certain scenarios, the control logic 205 determines what chunks that are within the scroll range are missing.

If one of the chunks is not within the range and/or another chunk has entered the scroll range for the layer, the contents are updated for the missing chunks (step 507). As such, new chunks that have not yet been rendered can be rendered for presentation. In certain scenarios, the complexity (e.g., the amount of detail rendered) can be varied based on a scrolling speed associated with the scroll intent. For example, a quick scroll may include a presentation of less detailed chunks initially and then add more detail if the scroll speed slows or is stopped. In certain scenarios, chunks can be replaced when more detail is rendered. This replacement chunk can be stored in a cache and retrieved at a later time to present. As such, the replacement chunk can be utilized in scrolling at fast speeds because it is already cached. Once the layer has been processed, the next layer is processed (step 509). The processing may additionally be accomplished in parallel (e.g., via one or more processors and/or graphics logic). Once the layers are processed, the complete presentation is rendered (e.g., by the graphics logic 207). Then, the control logic 205 can determine to present the content on a display via the viewport (step 511).

Figure 6A:
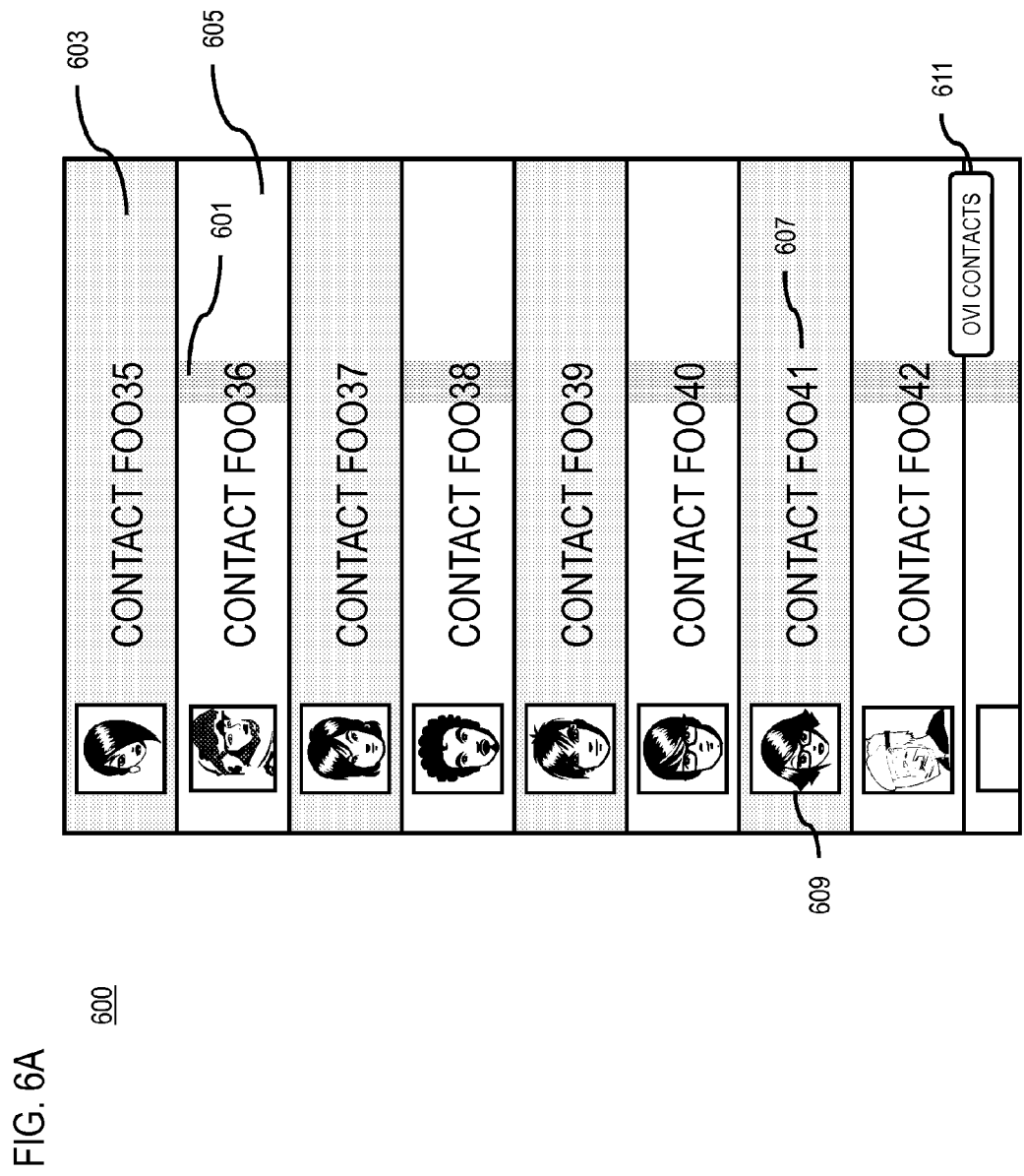
Figure 6B:
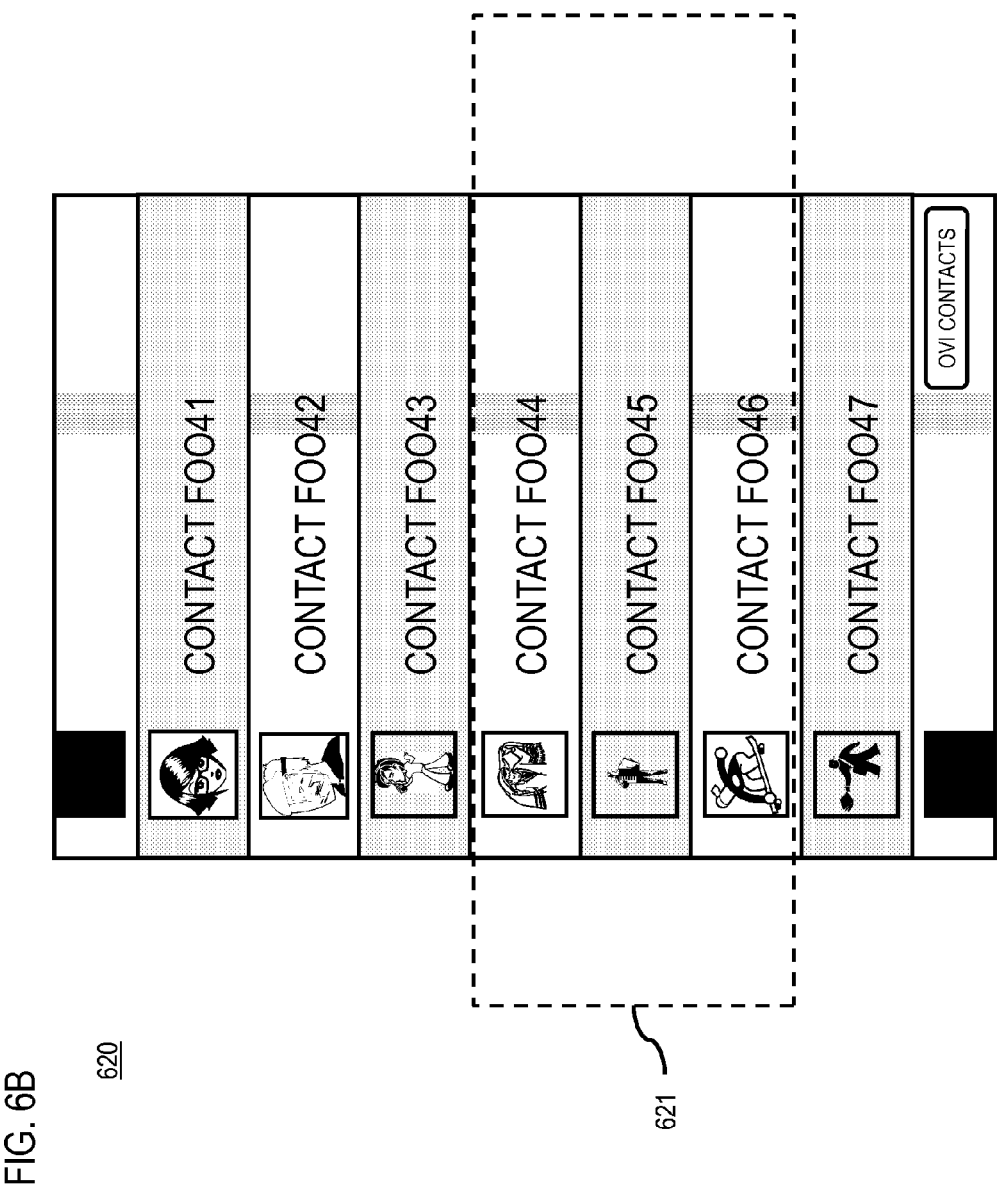

FIGS. 6A-6C are diagrams of user interfaces utilized in the processes of FIGS. 4 and 5, according to various embodiments. FIG. 6A shows a user interface 600 that includes scrollable content rendered using layers and chunks. The scrollable content can include a list of contacts including an identifier of the contact as well as an icon associated with the contact. In the user interface 600, a background image 601 is shown. This background image 601 includes a single vertical bar reaching throughout the user interface 600. The background image 601 can be rendered as a chunk to be viewed in a viewport the size of the user interface 600. Further, the chunk can be associated with a first layer.

A second image layer can include a pattern of alternating imaging schemes. A first image chunk 603 can be associated with shading that is to be viewed as on top of the background image layer. A second chunk 605 may include shading that is to be viewed as clear to allow for the background image layer to show through. The shading scheme can be alternating according to criteria and/or a pattern.

A third image layer can include text 607 associated with a list. The text 607 can be formed into a chunk that includes multiple text items. In the case of the user interface 600, one or more contact information text can be grouped into a chunk. For example, a chunk can be greater than the size of the viewport, include a single row of text, or include multiple rows of text. Further, icons 609 can be rendered in a separate fourth image layer. These icons may be more complex than the text. As such, it may be beneficial to limit the size of the chunks to fewer numbers of icons or single icons. Additionally or alternatively, the text layer and icon layer may be combined into a single layer of chunks.

Additionally, a fifth layer can include a foreground image 611. The foreground image 611 can be placed on top of other images associated with other layers. Further, the foreground layer can be rendered once and displayed without need for re-rendering. Additionally, foreground image 611 and/or any other images or chunks may be interactive. For example, when a user selects contact FOO41, a contact user interface may be shown. FIG. 6A shows a simple foreground image 611, however, it is contemplated that additional types of foreground images, such as a navigation bar (e.g., a navigation bar across the top of the viewport), logos, etc. can be presented. Further, more than one chunk and/or image item can be utilized in one or more foreground layers.

FIG. 6B shows a user interface 620 that displays additional contacts after a scrolling intent is received and processed from FIG. 6A. For example, scroll intent downwards is processed and contacts FOO41 through FOO47 are shown instead of contacts FOO35 through FOO42. The same chunk approach is utilized to present the content. With this approach, contact FOO41 is moved to the top of the user interface 620. Other contacts, such as contact FOO47 are introduced. Additionally, the background and foreground images have not changed and thus re-rendering of the chunks need not occur. Further, FIG. 6C shows a user interface 640 of additional scrolling of the list downwards. The same chunk patterns can be utilized and chunks may be reused. For example, textual information for contacts FOO44, FOO45, and FOO46 can be rendered as a single chunk 621 as shown in FIG. 6B. When the content is scrolled, the chunk 621 associated with FOO46 need not be rendered. Instead, a different view 641 of the chunk 621 can be displayed.

With the above approaches, chunks of items can be processed in layers to allow for rendering of fixed elements to occur less often. As such, other items can be rendered in chunks. This approach allows for devices with powerful graphics logic to utilize the processing power of the graphics logic to remove a bottleneck from using control logic. This bottleneck can occur if software is partially or fully used to render parts of presentable content. Further, because chunks are utilized, graphical operations (e.g., setting font parameters in text chunks) can be optimized across the chunk. When chunks are reused, the chunks need not be re-rendered, saving rendering and overhead costs.

The processes described herein for rendering content may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
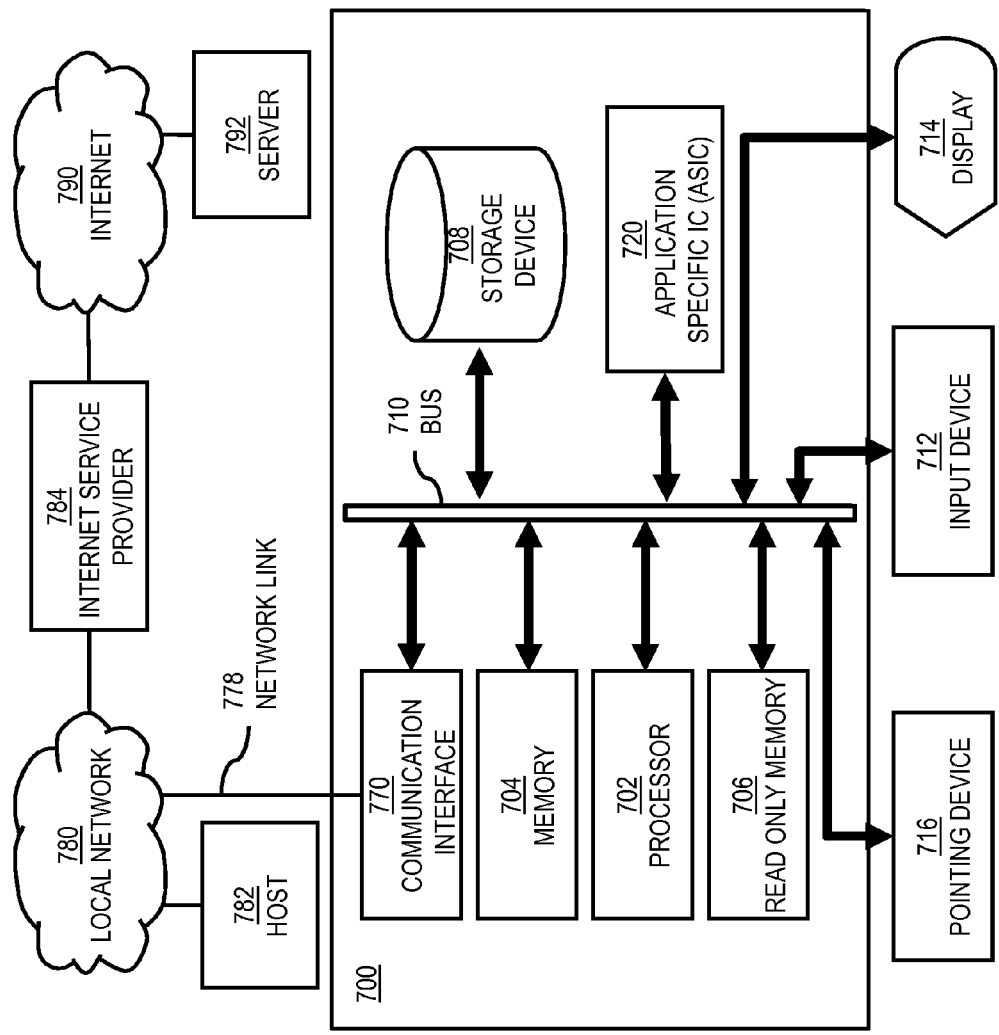
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to render content as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of rendering content.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to render content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for rendering content. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for rendering content, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to render content as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of rendering content.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to rendering content. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of rendering content. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of rendering content. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to render content. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a request to render content at a device;
determining one or more layers of the content;
determining one or more patterns of the content corresponding to one or more of the layers;
determining a plurality of chunks based, at least in part, on the one or more patterns; and
rendering at least one of the layers and the corresponding plurality of chunks separately from the other layers,
wherein at least one of the plurality of chunks that is determined based on the at least one pattern is different from another one of the plurality of chunks.

2. A method of claim 1, further comprising:
receiving an input specifying a portion of the content for display; and
determining the plurality chunks based, at least in part, on the input.

3. A method of claim 1, wherein at least one of the patterns is a repeatable geometry-based pattern.

4. A method of claim 1, further comprising:
caching the plurality of chunks at a rendering engine,
wherein the rendering of the at least one of the layers is based, at least in part, on the cached plurality of chunks.

5. A method of claim 4, further comprising:
recycling the cached plurality of chunks for subsequent renderings of the content or a portion of the content.

6. A method of claim 1, wherein the content represents a scrollable list of a plurality of items, and wherein at least one of the plurality of chunks represents multiple ones of the items.

7. A method of claim 6, further comprising:
receiving an input specifying a scroll range corresponding to the scrollable list;
determining a set of the items within the scroll range; and
determining the plurality of chunks based, at least in part, on the set of the items.

8. A method of claim 1, wherein the one or more layers include a background layer, a foreground layer, a variable content layer, or a combination thereof.

9. An apparatus comprising:
at least one processor; and
at least one memory including computer program code for one or more programs,
the at least one memory and the computer program code configured to, with the at least one processor, cause the apparatus to perform at least the following,
receive a request to render content at a device;
determine one or more layers of the content;
determine one or more patterns of the content corresponding to one or more of the layers;
determine a plurality of chunks based, at least in part, on the one or more patterns; and
render at least one of the layers and the corresponding plurality of chunks separately from the other layers,
wherein at least one of the plurality of chunks determined based on the at least one pattern is different from another one of the plurality of chunks.

10. An apparatus of claim 9, wherein the apparatus is further caused to:
receive an input specifying a portion of the content for display; and
determine the plurality of chunks based, at least in part, on the input.

11. An apparatus of claim 9, wherein at least one of the patterns is a repeatable geometry-based pattern.

12. An apparatus of claim 9, wherein the apparatus is further caused to:
cache the plurality of chunks at a rendering engine,
wherein the rendering of the at least one of the layers is based, at least in part, on the cached plurality of chunks.

13. An apparatus of claim 12, wherein the apparatus is further caused to:
recycle the cached plurality of chunks for subsequent renderings of the content or a portion of the content.

14. An apparatus of claim 9, wherein the content represents a scrollable list of a plurality of items, and wherein at least one of the plurality of chunks represents multiple ones of the items.

15. An apparatus of claim 14, wherein the apparatus is further caused to:
receive an input specifying a scroll range corresponding to the scrollable list;
determine a set of the items within the scroll range; and
determine the plurality of chunks based, at least in part, on the set of the items.

16. An apparatus of claim 9, wherein the one or more layers include a background layer, a foreground layer, a variable content layer, or a combination thereof.

17. A non-transitory computer-readable storage medium carrying one or more sequences of one or more instructions which, when executed by one or more processors, cause an apparatus to at least perform the following steps:
receiving a request to render content at a device;
determining one or more layers of the content;
determining one or more patterns of the content corresponding to one or more of the layers;
determining a plurality of chunks based, at least in part, on the one or more patterns; and
rendering at least one of the layers and the corresponding plurality of chunks separately from the other layers,
wherein at least one of the plurality of chunks determined based on the at least one pattern is different from another one of the plurality of chunks.

18. A non-transitory computer-readable storage medium of claim 17, wherein the apparatus is further caused to perform:
receiving an input specifying a portion of the content for display; and
determining the plurality based, at least in part, on the input.

19. A non-transitory computer-readable storage medium of claim 17, wherein at least one of the patterns is a repeatable geometry-based pattern.

20. A non-transitory computer-readable storage medium of claim 17, wherein the apparatus is further caused to perform:
caching the plurality of chunks at a rendering engine,
wherein the rendering of the at least one of the layers is based, at least in part, on the cached plurality of chunks.

* * * * *